(12) United States Patent
Grosdidier

(10) Patent No.: US 10,378,722 B2
(45) Date of Patent: Aug. 13, 2019

(54) LIGHTING SYSTEM, IN PARTICULAR FOR A MOTOR VEHICLE LIGHTING MEMBER, COMPRISING INTEGRATED LEDS

(71) Applicant: RENAULT S.A.S., Boulogne Billancourt (FR)

(72) Inventor: Francois Grosdidier, Sermoise (FR)

(73) Assignee: RENAULT S.A.S., Boulogne Billancourt (FR)

( * ) Notice: Subject to any disclaimer, the term of this patent is extended or adjusted under 35 U.S.C. 154(b) by 104 days.

(21) Appl. No.: 14/906,178

(22) PCT Filed: Jul. 18, 2014

(86) PCT No.: PCT/FR2014/051852
§ 371 (c)(1),
(2) Date: Feb. 17, 2016

(87) PCT Pub. No.: WO2015/011381
PCT Pub. Date: Jan. 29, 2015

(65) Prior Publication Data
US 2016/0161080 A1    Jun. 9, 2016

(30) Foreign Application Priority Data

Jul. 22, 2013 (FR) ..................... 13 57170

(51) Int. Cl.
*B60Q 1/00* (2006.01)
*F21S 43/20* (2018.01)
(Continued)

(52) U.S. Cl.
CPC ............ *F21S 43/26* (2018.01); *B60Q 1/0052* (2013.01); *B60Q 3/64* (2017.02); *B60Q 3/80* (2017.02);
(Continued)

(58) Field of Classification Search
CPC ... F21V 5/02; F21V 5/04; F21V 5/045; F21V 5/046; F21V 5/048; F21V 17/04;
(Continued)

(56) References Cited

U.S. PATENT DOCUMENTS 4,234,912 A * 11/1980 Barnes .................... F21S 8/086
362/145
4,767,172 A    8/1988 Nichols et al.
(Continued)

FOREIGN PATENT DOCUMENTS

DE     102 31 326 A1    2/2004
EP     2 012 056 A1    1/2009
(Continued)

OTHER PUBLICATIONS

English Machine Translation of EP 2587120 from Espacenet.*
(Continued)

*Primary Examiner* — Zheng Song
(74) *Attorney, Agent, or Firm* — Oblon, McClelland, Maier & Neustadt, L.L.P.

(57) ABSTRACT

A lighting system for a motor vehicle includes a printed circuit board equipped with light-emitting diodes for producing light and an optical module to propagate and transmit the light. The optical module includes a reception surface to receive the light produced and an emission surface for retransmitting the light produced. The optical module includes a housing for receiving the printed circuit board equipped with light-emitting diodes and the housing includes an internal wall forming the reception surface.

12 Claims, 2 Drawing Sheets

(51) Int. Cl.
*B60Q 3/64* (2017.01)
*B60Q 3/80* (2017.01)
*F21S 43/14* (2018.01)
*F21S 43/241* (2018.01)
*F21S 43/236* (2018.01)

(52) U.S. Cl.
CPC ............ *F21S 43/14* (2018.01); *F21S 43/236* (2018.01); *F21S 43/241* (2018.01)

(58) Field of Classification Search
CPC ........ F21V 17/06; F21V 17/10; F21V 7/0058; F21Y 2105/18; F21Y 2103/30; F21Y 2103/33; F21S 48/1241; F21S 48/125; F21S 48/1258; F21S 48/215; F21S 48/22; F21S 48/2212; F21S 48/225; B60Q 1/0052; B60Q 3/64
See application file for complete search history.

(56) References Cited

U.S. PATENT DOCUMENTS

| | | | | |
|---|---|---|---|---|
| 6,244,732 B1* | 6/2001 | Futami | .................... | F21S 48/24 362/328 |
| 6,367,950 B1* | 4/2002 | Yamada | ................ | F21S 48/215 362/241 |
| 6,530,683 B1* | 3/2003 | Ohkohdo | ............. | B60Q 1/0041 362/511 |
| 6,619,829 B1* | 9/2003 | Chen | .................... | B60Q 1/0052 362/236 |
| 6,789,929 B1* | 9/2004 | Doong | ................ | B60Q 1/0052 362/23.16 |
| 7,726,980 B1* | 6/2010 | Wang | .................... | B60Q 1/0088 439/276 |
| 9,062,845 B1* | 6/2015 | Tsai | .................... | B60Q 1/0052 |
| 2006/0067086 A1* | 3/2006 | Hsu | ...................... | B60Q 1/0052 362/544 |
| 2010/0039824 A1* | 2/2010 | Wang | .................... | B60Q 1/0052 362/310 |
| 2010/0246176 A1* | 9/2010 | Shyu | ....................... | F21V 5/007 362/235 |
| 2010/0328963 A1* | 12/2010 | Miyagawa | ................ | B62J 6/02 362/473 |
| 2011/0157901 A1* | 6/2011 | Chen | .................... | F21V 17/164 362/373 |
| 2011/0261570 A1 | 10/2011 | Okada et al. | | |
| 2012/0120667 A1* | 5/2012 | Schenkl | ................ | D06F 37/266 362/335 |
| 2014/0022808 A1* | 1/2014 | Chan | .................... | F21S 48/1104 362/516 |
| 2014/0168975 A1* | 6/2014 | Ng | .......................... | F21V 5/007 362/244 |

FOREIGN PATENT DOCUMENTS

EP 2 587 120 A1 5/2013
JP 2004319380 * 4/2003 ................ F21S 8/10

OTHER PUBLICATIONS

English Machine Translation of JP 2004319380 provided by Espacenet.*
English Machine Translation of EP 2587120 from Espacenet (Year: 2013).*
International Search Report dated Nov. 14, 2014 in PCT/FR2014/051852 (with English language translation).

* cited by examiner

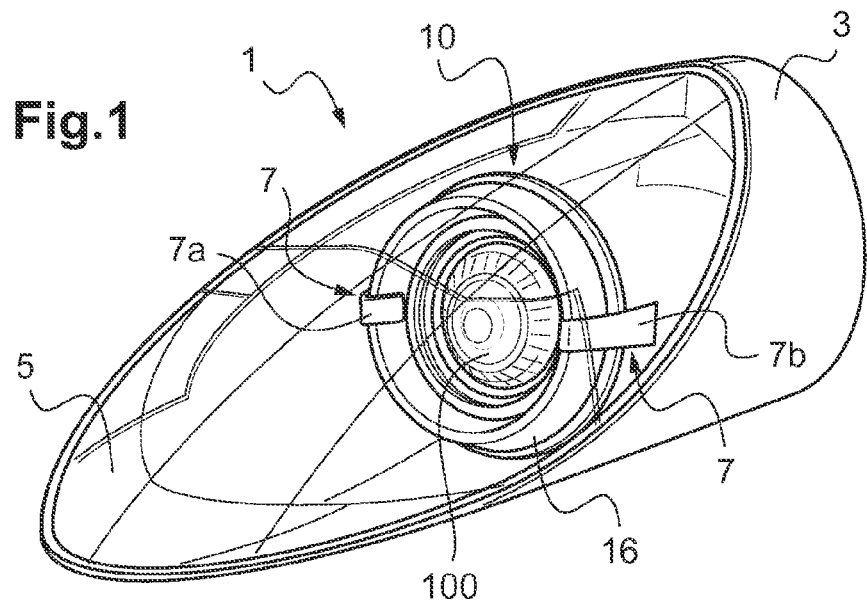
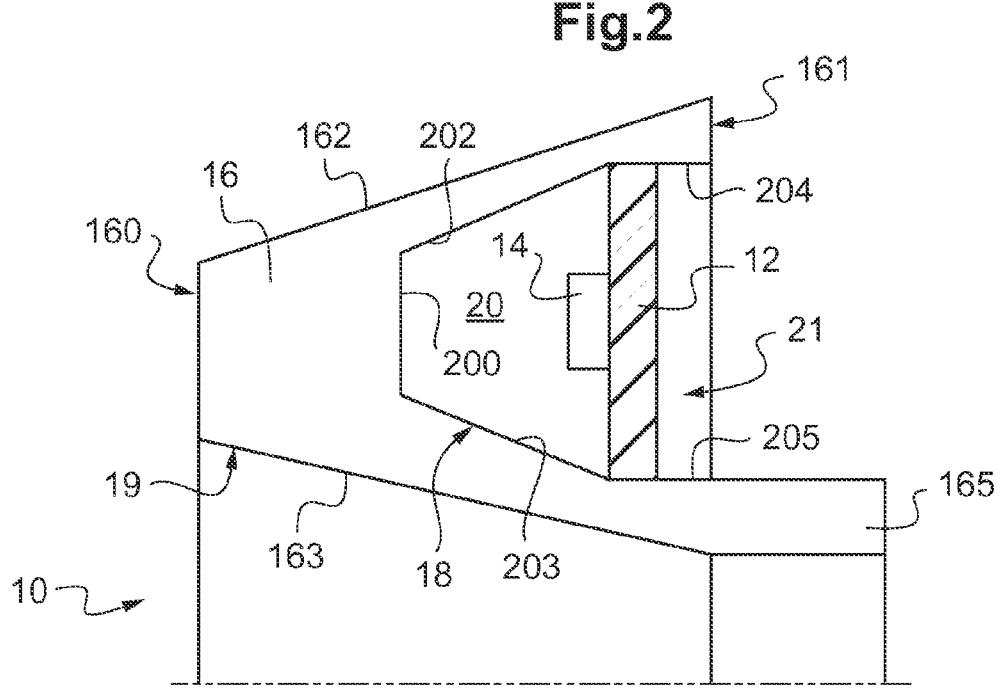

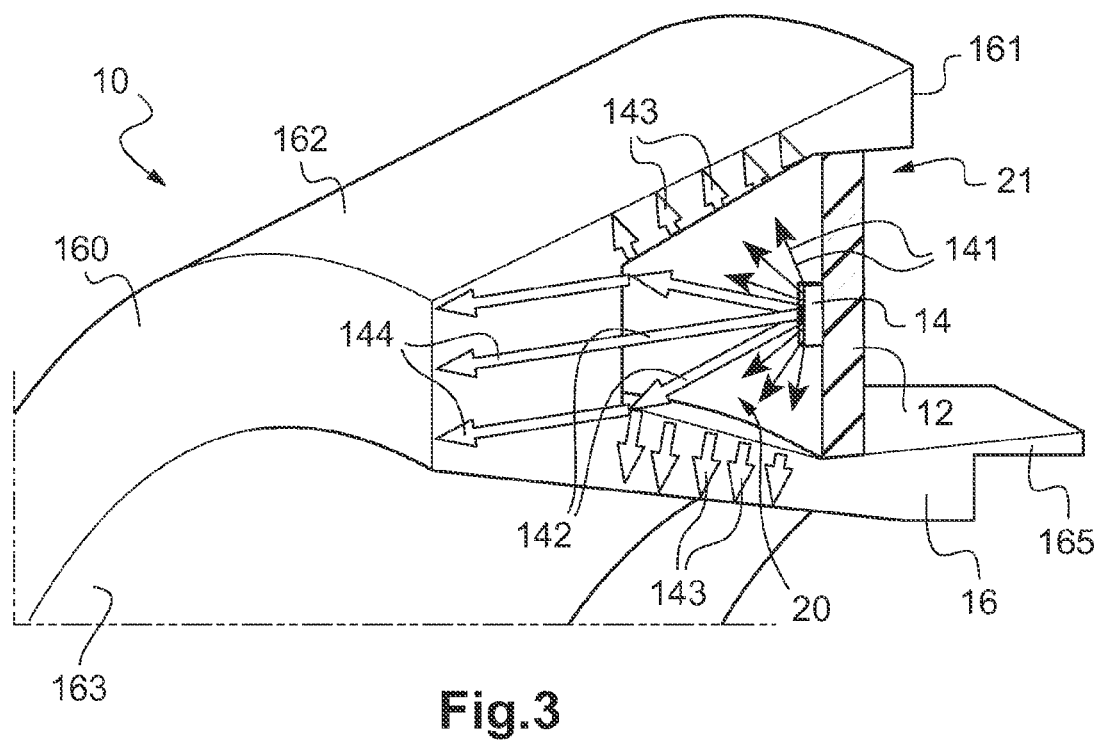

LIGHTING SYSTEM, IN PARTICULAR FOR A MOTOR VEHICLE LIGHTING MEMBER, COMPRISING INTEGRATED LEDS

The invention relates to a lighting system, notably for a motor vehicle lighting member, with integrated LEDs, notably with LEDs integrated in an optical module.

Some lighting systems comprise a printed circuit board equipped with light-emitting diodes, commonly called LEDs, electrically connected to the printed circuit. A printed circuit board, often referred to by the acronym PCB, is a support, generally a plate, making it possible to electrically link together a set of electronic components, in order to produce a complex electronic circuit. This plate is planar and consists of an assembly of one or more thin layers of copper separated by an insulating material. Such a plate can be rigid or flexible. In a lighting device, a printed circuit board, or plate, equipped with LEDs, is generally arranged at right angles to the desired lighting direction for a good light rendition, most of the light beam being emitted by the diodes in a direction at right angles to the printed circuit board. However, in the automotive field and in particular in application in a headlight, such a positioning, at right angles to the lighting direction, imposes a significant bulk on the headlight and constraints on the design.

There are also lighting systems involving a light optical module associated with LEDs to ensure a light guide function. The LEDs are then arranged at a short distance from the optical module in order for the optical module to receive the light emitted by the LEDs. The optical module is often incorporated in another element of the lighting system, for example a mask or a deflector. Such masks often extend at right angles to the lighting direction of the LEDs, at a distance therefrom. Such lighting systems thus consist of numerous elements to be arranged relative to one another which can make their assembly complex. Furthermore, such lighting systems can have a significant volume which can limit their arrangement and their form, which is not desirable, particularly in the automotive field. Moreover, in this type of lighting system, each LED is differentiated and visible. For esthetic reasons, it may be shrewd practice to improve the stylistic appearance of the lighting system while conserving its lighting functions.

There is therefore a need for a lighting system that makes it possible to at least partially remedy these drawbacks and vary the design.

To this end, one object of the invention relates to a lighting system, notably for a motor vehicle headlight, comprising a printed circuit board equipped with light-emitting diodes suitable for producing light, and an optical module formed to propagate and transmit said light, this optical module having a reception surface intended to receive said light produced and an emission surface for retransmitting said produced light, characterized in that said optical module has a housing for receiving said printed circuit board equipped with light-emitting diodes and in that said housing has an internal wall forming said reception surface.

By virtue of such a positioning of the printed circuit board inside the volume of the optical module, the lighting system obtained is particularly simple and compact. Furthermore, such an arrangement makes it possible to enhance the lighting esthetic. In effect, the optical module can have an esthetic appearance of "trompe-l'oeil" type, because it can, in a way, appear suspended inside the lighting system, with no visible supporting or holding elements. It is thus possible to produce a lighting system with a light-emitting element (assembly formed from the printed circuit board and the light-emitting diodes) which can be offset without being incorporated in another element of the lighting system such as a mask or a reflector, notably for the lighting systems forming optical blocks of motor vehicles.

Furthermore, the positioning of the printed circuit board inside the volume of the optical module makes it possible for the latter to pick up most of the light radiation emitted by the light-emitting diodes, notably from 95 to 100% of the light radiation emitted.

In particular, all of the light radiation emitted by the LEDs can be picked up when the printed circuit board closes the housing of the optical module. The present invention thus makes it possible to reduce the light losses.

In addition, the light rendition can be enhanced as a function of the distance separating the LEDs from the reception surface or of the arrangement of the reception surface. By way of example, this reception surface can be at a distance of the order of 0.5 to 5 cm from the LEDs. Also, by way of example, the reception surface and the LEDs can be arranged in such a way as to allow an illumination of the reception surface at an angle of between 120° and 250°, preferably at an angle of between 150° and 200°, even between 170° and 190°, in particular taking the value of 180°.

Advantageously and in a nonlimiting manner, the optical module can be formed in a polymer material or in glass, preferably translucent or transparent, suitable for propagating and guiding at least one light beam circulating inside its volume, notably a light beam emitted by light-emitting diodes. The material used can be any material suitable for guiding a light radiation, such as a material of glass or polymer type, colored or not, for example polycarbonate or poly(methylmethacrylate) (PMMA). Each optical module can thus be produced simply and its form can be adapted to the member intended to receive the lighting system.

In the context of the invention, "transparency" should be understood to mean the physical property which allows a material to allow light to pass without the latter undergoing scattering. On a microscopic scale, where the dimensions studied are much greater than the wavelengths of the photons concerned, it can be stated that, in this type of material, the photons follow the Snell-Descartes laws.

Advantageously and in a nonlimiting manner, said reception surface and/or said emission surface can have at least one portion suitable for diffusing a fraction of said light and/or a volume between a portion of the reception surface and a portion of the emission surface can be suitable for diffusing a fraction of said light.

"Diffusion" should be understood to mean the property whereby a material, or in the present case, at least a portion of inner or outer surface of the module, allows the light to pass, but whereby the photons are scattered and therefore no longer follow the Snell-Decartes laws. Such a material is also called translucent material.

A portion of the reception surface and/or a portion of the emission surface, and/or a volume between a portion of the reception surface and a portion of the emission surface, can therefore be arranged for the diffusion of a fraction of the light rays.

To this end, the portion of reception surface and/or the portion of emission surface and/or a volume between a portion of the reception surface and a portion of the emission surface, can be at least partially grained, textured or etched, according to methods known per se, or be in translucent material, in order to allow the light scattering or diffusion. Such a grained, textured or etched part can be extended to a sufficient thickness to allow for a diffusion of the light rays, or throughout the entire thickness of the optical module.

A part of the optical module can thus be in a translucent material in order, for example, to hide the printed circuit board and the LEDs, another part being in transparent material. Such an optical module can be produced in a single piece or in several pieces assembled together.

Advantageously, the portion of reception surface and/or the portion of emission surface and/or the volume between a portion of the reception surface and a portion of the emission surface, suitable for diffusing a fraction of said light, can be situated in such a way that the printed circuit board is not visible from at least one zone outside the optical module, for example a lateral zone.

The internal wall of the housing of the optical module can comprise at least two lateral walls and at least one bottom wall, notably a single bottom wall when the printed circuit board closes the housing. In this case, said at least two lateral walls can form the portion of reception surface suitable for diffusing a fraction of said light.

Advantageously and in a nonlimiting manner, said reception surface can have at least one other portion suitable for making another fraction of said light converge. This can make it possible to concentrate a fraction of the light in a particular direction of the optical module, for example toward a zone that needs to be made brighter than the rest of the optical module.

Advantageously, this portion of reception surface suitable for making another fraction of the light converge can be arranged in such a way as to make this fraction of the light converge toward a particular zone of the emission surface.

Advantageously, the at one least other portion of reception surface has at least one optical device for collimating the light.

The optical device for collimating, deflecting or converging the light rays can involve one or more conventional optical elements of Fresnel lens, diopter, prism or facet type. Such an optical device is intended to make the incident light rays converge toward the emission surface of the optical module, notably toward a particular zone of the emission surface of the optical module.

The optical collimation device can advantageously be fixed onto at least one surface zone of the other portion of the internal wall, or be etched on said surface zone, by methods that are known per se.

The internal wall of the housing of the optical module can comprise at least two lateral walls and at least one bottom wall, notably a single bottom wall when the printed circuit board closes the housing. In this case, said bottom wall can form the other portion of reception surface suitable for making a fraction of said light converge.

Advantageously, the housing can have a portion of internal wall suitable for diffusing a fraction of the light rays and another portion of internal wall suitable for making another fraction of said light converge. Such an arrangement offers the esthetic advantage of masking the LED light source or sources. It is thus possible to hide the light source from the view of a human being. The optical module, then ensuring the lighting function by diffusion and transmission of the light beam, can thus be entirely illuminated continuously and uniformly by the set of LEDs. The portion of wall diffusing the light can notably make it possible to laterally illuminate the module by masking the LEDs, the portion of the internal wall for convergence of the rays making it possible to contribute to the lighting function of the module. In this case, the visual appearance of such a module is enhanced in stylistic terms.

Advantageously and in a nonlimiting manner, said internal wall of the housing can comprise at least two lateral walls and at least one bottom wall, notably a single bottom wall, and the emission surface of said optical module can have an outer surface substantially parallel to said bottom wall and at least two lateral outer surfaces substantially parallel to said at least two lateral walls respectively. The emission surface can thus form an external wall of the optical module, notably almost all of the external wall of the optical module. The outer surface substantially parallel to the bottom wall can thus, for example, be a so-called "front" outer surface by contrast to the position of the housing which can emerge at the rear of the optical module. The lateral outer surfaces can form a portion of emission surface suitable for diffusing the light. To this end, this portion can be at least partially grained, textured or etched.

The housing can be a groove or slot opening on a rear face opposite the front outer surface, for example parallel or substantially parallel thereto, for example over the entire periphery of the module. The cross section of this groove or slot can be polygonal, for example trapezoidal, or elliptical, for example in the form of a circular arc, or any other suitable form.

The optical module can have a crown ring form or similar, which can be cylindrical, conical or frustoconical, even elliptical. The invention is not however limited to a particular form of the optical module, which is likely to take any form suited to the lighting system concerned.

The invention relates also to a motor vehicle lighting member equipped with a lighting system according to the invention.

This lighting member can notably be chosen from a headlight (or optical block) for the signaling of the vehicle and an ambient light intended to be situated inside the vehicle interior. Preferably, the member is a headlight.

A lighting member usually comprises a casing of which one face is translucent or transparent for the exiting of the light beam. The lighting system according to the invention is then arranged inside the casing and fixed thereto by at least one fixing element, the direction of the lighting system being such that the light produced by the LEDs exits through the translucent or transparent face of the casing.

The fixing element or elements can be rods or strips of different forms and sizes, such as rectangular. Preferably, the fixing element or elements are produced in materials identical to those of the optical module, which can make it possible to increase the "suspended" effect of the optical module, such elements imparting little or no disturbance to the propagation of the light.

The number of the fixing elements is not limited, provided that it can ensure the holding function. Generally, at least two fixing elements are used, but just one is possible.

The fixing element or elements can be fixed onto an outer surface of the optical module by an end zone of said elements, the opposite end zones being able to be fixed onto the casing.

Another object of the invention relates to a motor vehicle equipped with at least one lighting system according to the invention.

In particular, said lighting system can equip at least one of the following members:
an ambient light situated inside the vehicle interior,
a vehicle signaling light.

This signaling light, front or rear, can notably be chosen from a daytime running light (light that comes on automatically when the vehicle starts moving, also known by the acronym "DRL"), a sidelight, a reversing light, a fog lamp, a flashing light, a stop light or any other signaling light.

The invention is now described with reference to the nonlimiting attached drawings in which:

FIG. 1 is a perspective view of a vehicle headlight equipped with a lighting system according to the invention;

FIG. 2 represents a partial schematic view in cross section of the lighting system of FIG. 1;

FIG. 3 is a partial cross-sectional view, in perspective, of the lighting system of FIG. 1.

"Substantially parallel" should be understood to mean a direction forming an angle of at most ±20° or of at most ±10° with a particular direction.

FIG. 1 represents a headlight 1 for the signaling of the vehicle, comprising a casing 3 of which one face 5 is translucent or transparent for the exiting of the light beams. This face 5 can adopt any planar or more complex form as in the example represented.

This headlight 1 is equipped with a lighting system 10 according to the invention, which is represented in more detail in FIGS. 2 and 3.

The lighting system 10 thus comprises:
- a printed circuit board 12 equipped with light-emitting diodes 14 suitable for producing light (141, 142) (for greater clarity, a single diode is represented in FIGS. 2 and 3), and
- an optical module 16 having a reception surface 18 intended to receive said light (141, 142) produced and an emission surface 19 for retransmitting said produced light (143, 144).

According to the invention, the optical module 16 has a housing 20 for receiving the printed circuit board 12 equipped with light-emitting diodes, this housing 20 being defined by the reception surface 18 of the optical module 16. In other words, the housing 20 has an internal wall which forms the reception surface 18.

In the example represented, the optical module 16 has a frustoconical crown-ring form having a front outer surface 160, a rear outer surface 161 parallel to the front outer surface 160, these two front and rear outer surfaces 160 and 161 respectively being planar and linked by lateral outer surfaces 162, 163, respectively outer and inner, which form the lateral walls of the truncated cone which converge toward the front outer surface 160. This optical module 16 is for example in transparent PMMA. In the example represented, the front 160 and lateral 162 and 163 outer surfaces form the emission surface 19 of the optical module 16.

It should be noted that the rear outer surface 161 can comprise a protruding interior part 165, protruding in the axial direction of the truncated cone, in the direction opposite to the front outer surface 160. Such a protruding interior part 165 can allow for a link with another element of the lighting system, for example the element 100 described below or a part of the casing.

In the example, the housing 20 is a groove produced in the material of the optical module 16, the opening 21 of which emerges on the side of the rear outer surface 161 of the optical module 16, in the plane thereof. In the example, the housing 20 has a trapezoidal section, the internal wall 18 of which comprises a bottom wall 200 and two lateral walls 202 and 203 respectively. The bottom wall 200 extends parallel to the front outer surface 160 of the optical module, the lateral walls 202 and 203 extending respectively substantially parallel to the lateral outer surfaces 162 and 163 respectively of the optical module 16, but with a greater convergence in the example than the walls of the optical module. On the side of its opening 21, the internal wall 18 of the housing also has end lateral walls 204, 205 parallel to one another and substantially at right angles to the bottom wall 200.

In the example represented, the housing 20 therefore also has a frustoconical crown-ring form and extends over the entire periphery of the optical module 16.

In this example, the printed circuit board 12 closes the housing 20 substantially parallel to the bottom wall 200 of the housing 20, the LEDs 14 being situated facing this bottom wall 200 and at a distance therefrom, inside the housing 20. Notably, the printed circuit board 12 bears against the end lateral walls 204, 205 which form a seat for the printed circuit board 12. The latter thus has an annular form in the example represented.

For any lighting system, whatever the form of the housing and/or of the optical module, the LEDs are preferably situated at a distance from the internal wall 18 of the housing 20, as represented.

In the example represented, the lateral walls 202, 203 respectively of the housing 20 form a portion of internal wall 18 suitable for diffusing a fraction of said light 141. In order to be able to diffuse the light, the surface of these lateral walls 202, 203 is grained, etched or textured (not visible). The bottom wall 200 of the housing 20, for its part, forms another portion of internal wall 18 suitable for making another fraction of said light 142 converge. To this end, this bottom wall 200 can form a Fresnel lens, thus making it possible to collimate the light 144 toward the front zone of the optical module 16, notably toward its front outer surface 160.

FIG. 3 shows more particularly the directions taken by the light rays (black 141 and white 142 arrows) emitted by the LED 14. A fraction of the light 141 lights the lateral walls 202, 203 of the internal wall 18, the surface of which is grained, etched or textured to diffuse or scatter the light 141 received. The light 143 passes through the lateral walls 202, 203 and is propagated toward the lateral external walls 162, 163 respectively of the optical module 16. This diffusion makes it possible to mask the LED 14 from the view of a human being through the lateral outer surfaces 162, 163. Generally, this masking can be increased when the part of the optical module 16 situated between the lateral walls 202, 203 and the lateral external walls 162, 163 is translucent. The optical module can then possibly be produced in two parts, a so-called rear translucent first part situated around the lateral walls of the housing and a so-called front transparent second part, from the bottom wall of the housing to the front outer surface of the module. As a variant or in combination, the lateral outer surfaces 162 and 163 can also be grained, etched or textured to diffuse or scatter the light.

Another fraction of the light 142 lights the bottom wall 200 forming a Fresnel lens. The bottom wall 200 makes it possible to make the light 142 converge toward the front outer surface 160, by passing through the part of the optical module 16 situated between the bottom wall 200 and the front outer surface 160. The light 144 having passed through this part of the optical module 16 makes it possible, as output, to ensure the lighting functions for the optical module 16.

Having a fraction of the light 141 able to illuminate the extreme edges of the lateral walls 202, 203 of the housing 20 is not excluded.

The lighting system 10, and notably its optical module 16, can be fixed to the casing 3 by two diametrically opposing fixing elements 7, represented in FIG. 1. Each fixing element 7 is formed from a rectangular strip of the same material as the optical module 16 (here, PMMA), a bent back end 7a of which mates with a front edge of the optical module 16 and the other end 7b of which is fixed to the casing 3, inside the latter.

It should be noted that the lighting system represented also comprises another optical device, here a headlight 100 using a halogen light source (not represented) provided with reflectors (not represented) to ensure, for example, the sidelight and high beam functions.

The lighting member described with reference to the figures is a motor vehicle headlight.

However, the invention is in no way limited by the type and the form of the lighting member, which can also be an interior or exterior lighting member, for a vehicle or a building.

The lighting system according to the invention in effect offers the advantage of being able to be used in numerous members for which the particular aim is to reduce the bulk and the weight and improve the appearance.

The invention claimed is:

1. A lighting system for a motor vehicle, comprising:
   a headlight having a light source;
   a printed circuit board equipped with light-emitting diodes to produce light; and
   an optical module to propagate and transmit said produced light, said optical module including a solid body that has a reception surface to receive directly said produced light, and an emission surface to retransmit said directly received light to outside the optical module, the solid body defining a solid volume between the reception surface and the emission surface,
   wherein said optical module forms a housing that receives said printed circuit board equipped with said light-emitting diodes,
   wherein said housing includes an internal wall forming said reception surface of said optical module,
   wherein lateral internal end walls of said housing directly contact the printed circuit board equipped with said light-emitting diodes,
   wherein said reception surface and/or said emission surface has at least one portion configured to diffuse a first fraction of said directly received light and/or the solid volume of the solid body between a portion of the reception surface and a portion of the emission surface is configured to diffuse the first fraction of said directly received light,
   wherein said reception surface has at least one other portion configured to make converge a second fraction of said directly received light, which is different from the first fraction of said directly received light,
   wherein the headlight is external to the optical module that forms the housing,
   wherein the optical module forms a ring in a front view of the lighting system, and
   wherein the optical module in the form of the ring surrounds the headlight in the front view of the lighting system.

2. The lighting system as claimed in claim 1, wherein the printed circuit board closes the housing of the optical module.

3. The lighting system as claimed in claim 1, wherein said at least one portion of the reception surface and/or the emission surface configured to diffuse the first fraction of said directly received light has a surface that is at least partially grained, textured, or etched.

4. The lighting system as claimed in claim 1, wherein said at least one other portion has at least one light collimation device.

5. The lighting system as claimed in claim 1, wherein said internal wall of the housing comprises at least two lateral walls, different from said lateral internal end walls directly contacting the printed circuit board, and at least one bottom wall, and said at least two lateral walls form said at least one portion, and said bottom wall forms said at least one other portion.

6. The lighting system as claimed in claim 1, wherein said internal wall of the housing comprises at least two lateral walls, different from said lateral internal end walls directly contacting the printed circuit board, and at least one bottom wall, and said at least two lateral walls form said at least one portion, or said bottom wall forms said at least one other portion.

7. The lighting system as claimed in claim 1, wherein said internal wall of the housing comprises at least two lateral walls, different from said lateral internal end walls directly contacting the printed circuit board, and at least one bottom wall, and the emission surface of said optical module has an outer surface substantially parallel to said bottom wall and at least two lateral outer surfaces substantially parallel to said at least two lateral walls, respectively.

8. A motor vehicle lighting member, comprising:
   a lighting system as claimed in claim 1.

9. The lighting member as claimed in claim 8, wherein the lighting member is a headlight of the motor vehicle.

10. A motor vehicle, comprising:
    at least one lighting system as claimed in claim 1, said at least one lighting system being comprised at least one of:
      an ambient light situated inside an interior of the vehicle, and
      a signaling light of the vehicle.

11. The lighting system as claimed in claim 1, wherein said lateral internal end walls are in direct contact with an entire periphery of the printed circuit board equipped with said light-emitting diodes.

12. The lighting system as claimed in claim 1,
    wherein said at least one other portion, which is configured to make converge the second fraction of said directly received light, is directly in front of all of the light-emitting diodes, and
    wherein said at least one portion, which is configured to diffuse the first fraction of said directly received light, is offset from the light-emitting diodes in the front view of the lighting system.

* * * * *